United States Patent [19]

Rogers et al.

[11] Patent Number: 5,411,397
[45] Date of Patent: * May 2, 1995

[54] AIRCRAFT FIRE FIGHTING TRAINER HAVING A MIXTURE OF LIQUID AND AGGREGATE PARTICLES AS A FUEL DIFFUSER

[75] Inventors: William Rogers, Hopatcong; James J. Ernst, Livingston; Steven Williamson, Haledon; Dominick J. Musto, Middlesex, all of N.J.

[73] Assignee: Symtron Systems, Inc., Fair Lawn, N.J.

[*] Notice: The portion of the term of this patent subsequent to Oct. 8, 2008 has been disclaimed.

[21] Appl. No.: 7,474

[22] Filed: Jan. 22, 1993

[51] Int. Cl.6 .............................. G09B 19/00
[52] U.S. Cl. ........................................ 434/226
[58] Field of Search ............................. 434/226

[56] References Cited

U.S. PATENT DOCUMENTS

| | | |
|---|---|---|
| 4,008,038 | 2/1977 | Berthiaume ..................... 431/2 X |
| 4,299,579 | 11/1981 | Swiatosz et al. ................. 434/226 |
| 4,303,397 | 12/1981 | Swiatosz ........................ 434/226 |
| 4,861,270 | 8/1989 | Ernst et al. ..................... 434/226 |
| 5,055,050 | 10/1991 | Rogers et al. ................... 434/226 |

Primary Examiner—Gene Mancene
Assistant Examiner—Jeffrey A. Smith
Attorney, Agent, or Firm—Richard T. Laughlin; Ribis, Graham & Curtin

[57] ABSTRACT

A fire fighting trainer for use in training fire fighters to extinguish jet crash fuel fires and the like, the trainer includes a supply pipe and control valve, a distribution pipe with holes, an open tank with a diffuser being a mixture of water and gravel within which the distribution pipe is disposed, so that liquid propane jets out from the holes, then passes as vapor bubbles to the diffuser surface, then collects as propane vapor on the surface, and a gas pilot flame device for lighting the propane vapor to form flames on the diffuser surface. The simulated flames look very similar to jet crash liquid fuel flames.

10 Claims, 1 Drawing Sheet

U.S. Patent   May 2, 1995   5,411,397
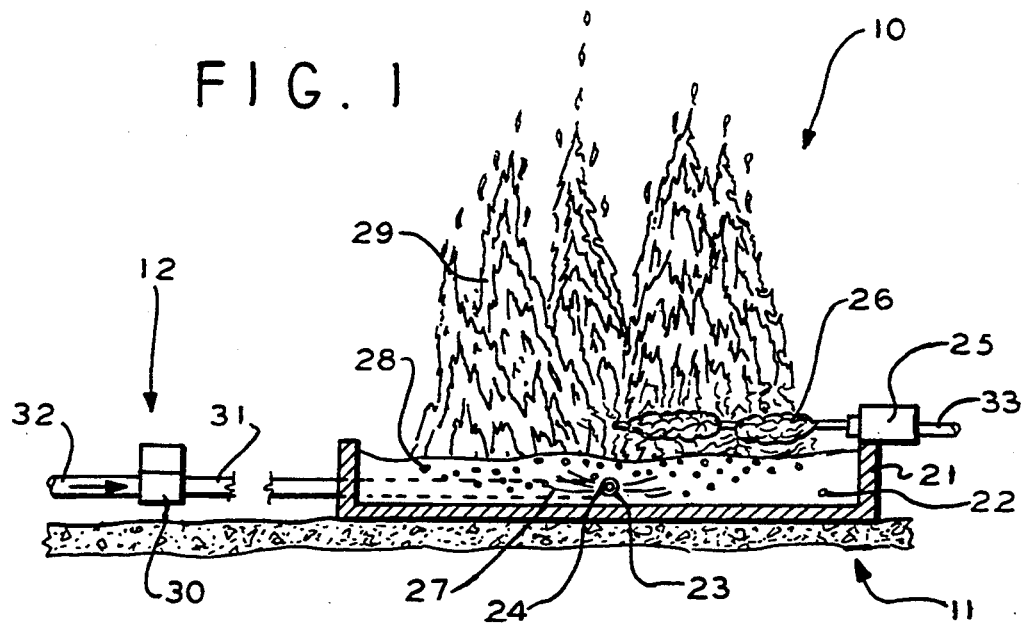
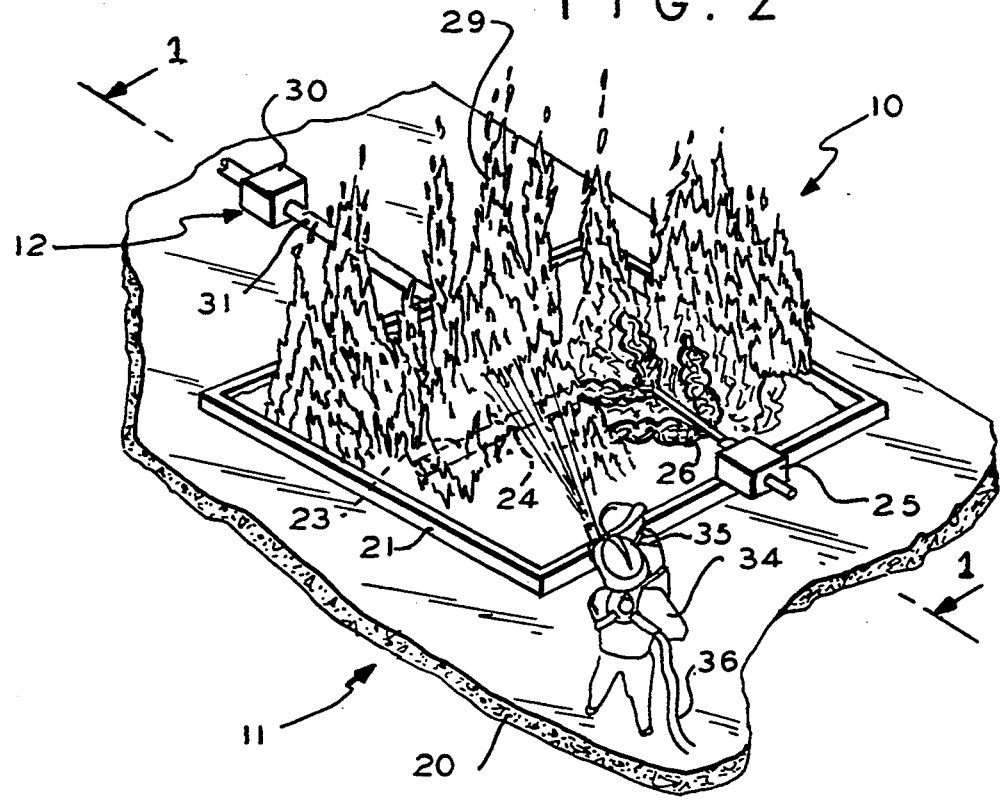

AIRCRAFT FIRE FIGHTING TRAINER HAVING A MIXTURE OF LIQUID AND AGGREGATE PARTICLES AS A FUEL DIFFUSER

The invention generally relates to an area fire fighting trainer such as one simulating an aircraft fire on the ground and, in particular, the invention relates to such a fire fighting trainer having a liquid propane burner system and having a diffuser of a combination of liquid and an aggregate.

BACKGROUND OF THE INVENTION

The prior art fire fighting trainer is described in U.S. Pat. Nos. 5,055,050, issued Oct. 8, 1991, and 4,861,270, issued Aug. 29, 1989, assigned to the same assignee as this application.

The prior art fire fighting trainer has a burner system and a support for the burner system, the burner system includes a delivery pipe having holes for ejecting propane to form a flame, a control connected to the delivery pipe, a pilot unit for lighting the ejected propane to form a flame, a control connected to the delivery pipe, and a pilot unit for lighting the ejected propane. The prior art system uses pressurized propane liquid which passes as vapor bubbles through a layer of gravel or water and then collects as propane vapor on the surface where it can be ignited to simulate an aircraft crash liquid fuel flames.

Such trainers are utilized outside exposed to normal climate conditions. When water is utilized in such a system it has certain disadvantages. One disadvantage is that there is excessive bubbling on the surface and applying sensors to determine the extinguishing of the flame is more difficult caused by the agitated water. It also has a relatively high noise level. Water also requires the use of expensive grating over the water to allowing the fire fighting trainers to walk over the surface. Aggregates such as gravel have the advantage of good vapor dispersion while also providing a firm surface on which the fire fighter trainess can walk. One disadvantage of the aggregate is that it does not protect the underlying surfaces or equipment from radiant heat as well as water.

SUMMARY OF THE INVENTION

According to the present invention, a fire fighting trainer is provided. This trainer comprises a burner system, a container, a diffuser maintained in the container, and a support for the burner system and the container. The burner system has a delivery pipe with holes for ejecting propane liquid and having a control connected to the delivery pipe and having a pilot unit. The container is an open tank and the diffuser includes a mixture of aggregate particles such as gravel and a liquid such as water contained in the tank in which the delivery pipe is immersed. The container is preferably from 39 to 152 feet in diameter.

By using an open tank with a mixture of aggregate and water in which the delivery pipe is immersed, distinct advantages are obtained. With such a system, the difficulty of lighting and controlling the propane vapor is minimized with the flame of the burning propane vapor having the appearance of a liquid fuel spill flame.

The aggregate particles can be any particles which resist burning but, as indicated, gravel is preferred because of its cost. It is important that the aggregate be non-porous since absorption of the propane is dangerous. The size of the aggregate particles has to be sufficient that it provides a safe walking surface and permits diffusion of the liquid propane into dispersed gas bubbles. The aggregate particles can be bluestone or graphite chips. A typical suitable size would be a blend of bluestone chips of about 0.5 to 2.5 inches in diameter with 1.5 and 2.0 inch diameter chips being preferred. The liquid is preferably water because of the cost, but other liquids can be utilized which will not burn at the temperatures of operation. Typical of such other liquids are high boiling point organic liquids which do not burn at the temperatures of operation.

The foregoing and other objects, features, and advantages will be apparent from the following description of the preferred embodiment of the invention as illustrated in the accompanying drawings.

BRIEF DESCRIPTION OF THE DRAWINGS

FIG. 1 is a section view of a fire fighting trainer according to the invention; and FIG. 2 is a perspective view of the fire fighting trainer of FIG. 1.

DESCRIPTION OF THE PREFERRED EMBODIMENT

As shown in FIGS. 1 and 2, a fire fighting trainer generally indicated at 10 is provided, the trainer includes a container 21, a diffuser 22, a burner system 12, and a support generally indicated at 11 such as a concrete slab 20 as indicated in FIG. 2.

The unit has an above-ground reservoir, or open tank 21 and has in this embodiment a volume of aggregate particles such as gravel and water collectively referred to as 22, which is contained in tank or container 21. The container may be an in-ground container with its top surface at ground level. The depth of the diffuser is preferably about 4 to 6 inches and is prepared by placing the aggregate in the container in a uniform layer in the desired depth and then filling the interstice with the liquid so that the liquid is just above the top of the aggregate so the liquid covers the aggregates. The liquid is present in from 25% to 75% by volume of the aggregates. The deeper the diffuser layer the slower the flame can be shut down.

Burner system 12 has a transverse liquid fuel, or pressurized liquid propane delivery pipe 23. Pipe 23 has a plurality of holes 24. Burner system 12 also has an intravenous or pilot flame device 25, which provides a pilot flame 26. Pipe 23 has pressurized liquid propane 27, which jets out or which is expelled into the gravel and water mixture 22. Liquid propane 27 then flashes into propane vapor 28, which diffuses through the gravel and water mixture 22 as propane vapor bubbles. Propane vapor 28 forms a flame of fire 29, which is disposed at the surface of the diffuser.

Burner system 12 also has a control or valve unit 30. Control 30 has a line 31, which is connected to transverse pipe 23. Control 30 is also connected to a supply line 32. Pilot flame device 25 has a pilot line 33, which is connected to a suitable gas supply (not shown). Fire fighters 34, 35, as shown in FIG. 2, use a hose 36 to fight the fire 29. Container tank 21 is made of steel, concrete or other suitable fireproof material and can be above or below surface level. Pipes 23, 31, 32, 33 are made of metal material.

In operation, when liquid propane is introduced into the propane delivery pipe 23 under pressure, the propane liquid 27 jets out of the holes 24 in pipe 23 and flashes to vapor, diffusing through the gravel and water mixture 22 as bubbles of vapor 28. As the propane vapor 28 reaches the upper surface of the gravel and water mixture 22, it is ignited by pilot flames 26 and produces a flame 29 that burns on the surface of the diffuser. The size of flame 29 may be varied from relatively small to large by control 30 which adjusts the rate of flow. Control 30 can be used to shut off liquid propane flow immediately in an emergency situation.

In summary, trainer 10 has an open tank 21 and propane delivery pipe 23, installed below the surface of the water and gravel mixture 22. Pipe 23 has holes 24, drilled along its submerged length. When liquid propane is introduced into delivery pipe 23 and out of holes 24, it flashes to propane vapor, and is diffused into the gravel and water 22 throughout the vicinity of pipe 23. The propane vapor rises to the surface and burns on the surface of the mixture 22 when ignited by a previously confirmed pilot flame 26, with the appearance of spilled liquid fuel, such as oil, gasoline, or jet fuel, burning on the surface of the gravel and water mixture 22.

Trainer 10 permits the use of clean-burning propane as a fuel in a device for training fire fighters 34, 35. Trainer 10 avoids the need of prior art trainers to burn oil or jet fuel, which produce a relatively large amount of pollutants.

Advantages of trainer 10 are indicated hereafter.

A) This disadvantage of utilizing water alone are overcome allowing a reduction in noise level, walking on the surface of the container and the use of simplified sensors for determining the extinguishing of the fire.

B) Trainer 10 utilizes liquid propane for training fire fighters in extinguishment of relatively large fires, comparable to fuel spill fires or aircraft crash fires.

C) Trainer 10 produces a controlled simulated fire, which is comparable to a real burning liquid fire.

While the invention has been described in its preferred embodiment, it is to be understood that the words which have been used are words of description rather than limitation and that changes may be made within the purview of the appended calms without departing from the true scope and spirit of the invention in its broader aspects.

For example, tank 21 can be installed in the ground instead of above the ground.

As another example, pipes 23, 31, 32 can be made of plastic material instead of metal material.

As still another example, intravenous 25 can be an electric intravenous, instead of a pilot flame device.

As a further example, trainer 10 can include safety monitors and sensing devices, or the like.

As a still further example, pipe 23 can have a different configuration. Also, a plurality of side-by-side open tanks can be used in place of a single tank 21.

What is claimed is:

1. In a fire fighting trainer comprising supply means for supplying a pressurized liquid fuel, distribution means connected to the supply means for distributing the liquid fuel into liquid fuel jets, a diffuser means having an upper surface and ignition means for igniting the liquid fuel vapor on the diffuser means upper surface to simulate a gasoline or similar fire, the improvement which comprises utilizing as said diffuser means a mixture of liquid and aggregate particles.

2. The trainer of claim 1, wherein the diffuser means liquid is water.

3. The trainer of claim 1, wherein the aggregate particles are gravel.

4. The trainer of claim 1, wherein the aggregate particles are gravel and the diffuser means liquid is water.

5. The trainer of claim 1, wherein the diffuser means liquid is present in 25 to 75% by volume of the aggregate particles.

6. The trainer of claim 5, wherein the diffuser means liquid is water and the aggregate particles are gravel.

7. The trainer of claim 5 wherein the aggregate particles are selected from the group consisting of bluestone and granite chips having a diameter of 0.5 to 2.5 inches.

8. The trainer of claim 5 wherein the aggregate particles are bluestone chips having a diameter of 1.5 to 2.0 inches.

9. The trainer of claim 1 wherein the diffuser has a depth of about 4 to 6 inches.

10. The trainer of claim 1 further comprising a container means for containing the diffuser means, wherein said container means has a diameter of from 50 to 150 feet.

* * * * *